April 25, 1967 M. J. HALPIN ET AL 3,315,881
SELF-LUBRICATING SYSTEM PARTICULARLY ADAPTABLE FOR
USE IN HIGH PRESSURE COMPRESSORS
Filed July 23, 1965
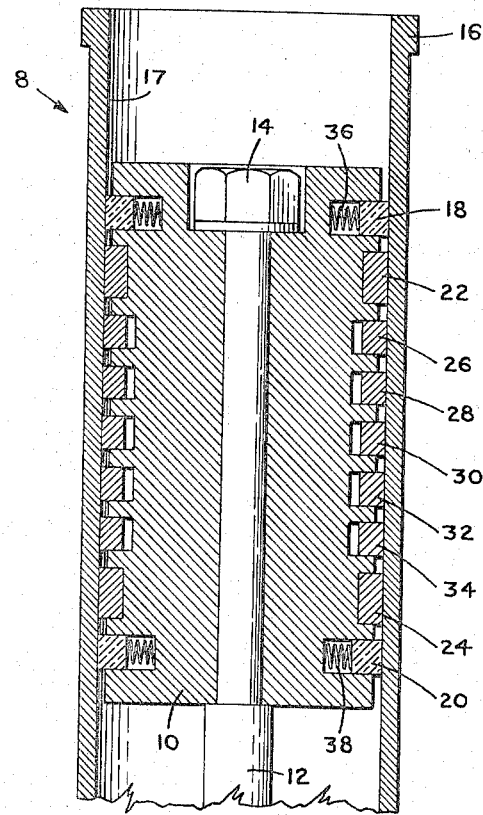
DEREK WOOLLATT
MARTIN J. HALPIN
INVENTORS
BY Daniel N. Bobis
Atty

3,315,881
SELF-LUBRICATING SYSTEM PARTICULARLY ADAPTABLE FOR USE IN HIGH PRESSURE COMPRESSORS

Martin J. Halpin, West Seneca, N.Y., and Derek Woollatt, West Didsburg, England, assignors to Worthington Corporation, Harrison, N.J., a corporation of Delaware
Filed July 23, 1965, Ser. No. 474,310
8 Claims. (Cl. 230—206)

This invention relates to a new and improved self-lubricating system for use with relatively movable, contacting elements and, more particularly, to a self-lubricating system for use in relatively high pressure, reciprocating compressors.

Reciprocating compressors which do not require lubricating oil are well known in the art, and are particularly adaptable for use in applications wherein the presence of oil, even in very small quantities, within the compressed air discharge is not acceptable. In many of the self-lubricating compressors of the prior art, the compressor parts in sliding contact are made from self-lubricating materials such as "Teflon" composites. Such self-lubricating compressors have, however, been determined to have unacceptable service lives for use with service discharge pressures of above 150 p.s.i.g. with atmospheric suction, due primarily to the high wear rate of "Teflon" composites, and the dimensional instability of "Teflon" composites which result in the flow thereof under load.

It is accordingly a primary object of this invention to provide a self-lubricating system which is particularly adapted for use in reciprocating compressors operating with service discharge pressures of up to 5500 p.s.i.g.

Another object of this invention is the provision of a self-lubricating system as above which is of particularly durable design and construction whereby long periods of satisfactory, maintenance-free operation thereof are assured.

A further object of this invention is the provision of a self-lubricating system as above which is of particularly uncomplicated design and construction, and which requires only the use of relatively inexpensive, readily available materials, whereby the costs of fabrication and installation thereof are minimized.

The above and other objects and advantages of this invention are believed made clear by the following detailed description thereof taken in conjunction with the accompanying drawings wherein:

The figure is a vertical cross-sectional view taken along the axis of the piston-cylinder liner assembly of a high pressure, reciprocating compressor which incorporates the self-lubricating system of the invention therein.

Referring now to the figure, a piston-cylinder liner assembly of a high pressure, reciprocating compressor is generally indicated at 8. A compressor piston is indicated at 10 and is connected as shown to a connecting rod 12 which extends therethrough by means of an attachment bolt 14 screw threadably secured to one extremity of the said connecting rod. The piston 10 is reciprocable in generally conventional manner within a cast iron cylinder liner 16.

A plurality of spaced, piston rings extend as shown from mounting grooves provided therefor in the piston 10, into sealing contact with the interior wall 17 of the cylinder liner 16 to prevent fluid bypass around the said piston. The said plurality of piston rings comprises first and second wiper rings 18 and 20, first and second rider rings 22 and 24 positioned as shown between the said wiper rings, and spaced sealing rings 26, 28, 30, 32 and 34, respectively, positioned between the said rider rings.

The wiper rings 18 and 20 are preferably biased, in conventional manner, toward the interior wall 17 of the liner 16 by biasing springs 36 and 38 positioned as shown behind the said wiper rings.

The self-lubricating feature of the piston-cylinder arrangement of the figure is provided for primarily by the nature of the materials utilized in the construction of the respective wiper rings 18 and 20. To this effect, the wiper rings 18 and 20 comprise one or more of the many well known solid lubricants, as for example, molybdenum disulphide, compacted together with a suitable binder therefor, as for example sodium silicate, to form a solid ring of suitable hardness. The thusly constructed wiper rings 18 and 20 are functionally analogous to a pencil lead which is a compacted combination of graphite and bentonite, and of course functions to leave a mark on a sheet of paper when drawn thereover. Thus may be readily understood whereby the said wiper rings will function to apply and maintain a film of a solid lubricant on the interior wall 17 of the cylinder liner 16 as the said rings traverse the said wall attendant the reciprocation of the piston 10 within the said cylinder liner.

To further insure the maintenance of the said solid lubricant film on the interior wall 17 of the cylinder 16, the former is coated in any convenient manner, as for example by spraying, with a suitable material which tends to cooperate with the solid lubricant contained in the wiper rings 18 and 20 and deposited thereby in film form on the said interior wall during reciprocation of the piston 10 as discussed hereinabove, to physically bond the said solid lubricant film to the said interior wall. Thus, for example, if the solid lubricant utilized in the wiper rings 18 and 20 is molybdenum disulphide, the interior wall 17 of the cylinder liner 16 is coated with molybdenum.

The remaining piston rings, namely the rider rings 22 and 24 and the respective sealing rings 26, 28, 30, and 34, are preferably made from any non-metal of suitable stress resistant characteristics to enable the operation of a reciprocating compressor at higher service discharge pressures than have heretofore proven practicable through the use of self-lubricating, reciprocating compressors, as for example service discharge pressure of up to 5500 p.s.i. Examples of non-metals which have proven particularly suitable for use in the construction of the respective rider and sealing rings are the many, readily available compacted combinations of carbon and graphite, the non-metallic character of which will, in any event, prevent seizure of the said rider and sealing rings in the event of lubrication failure of the bonded, solid lubricant film discussed above.

Although the self-lubricating system of the invention has been disclosed herein as particularly adaptable to use in the piston-cylinder assemblies of high pressure compressors, it is to be clearly understood that the said system is in no way limited to this type of application, but rather, is well suited for advantageous application to a very wide variety of structures which require lubrication between relatively movable, contacting elements thereof.

It will be understood that the invention is not to be limited to the specific construction or arrangement of parts shown but that they may be widely modified within the invention defined by the claims.

What is claimed is:
1. In a self-lubricating system for a reciprocating compressor comprising:
 (a) a cylinder liner;
 (b) said liner having a non-clogging porous coating on the inner wall thereof;
 (c) a piston reciprocal within said liner;

(d) piston ring means on said piston extending therefrom into contact with said inner wall of the cylinder liner;

(e) said piston ring means comprising a consumable self-lubricating material applied to said coated liner upon reciprocation of said piston;

(f) and the non-clogging porous coating on the inner wall of the cylinder liner comprising a material which cooperates with the piston ring means to maintain relative lubricity between the piston ring means and said inner wall of the cylinder liner, whereby sufficient liner porosity is maintained by the properties of the material forming the coating on the inner wall of the cylinder liner.

2. A self-lubricating system as in claim 1 wherein said piston ring means self-lubricating material is molybdenum disulphide and said coating on the inner wall of the cylinder liner is molybdenum.

3. A self-lubricating system for a reciprocating compressor comprising: a cylinder liner, a piston reciprocable within the cylinder liner, a pair of wiper rings mounted in spaced relation on the piston and extending from the piston into contact with the cylinder liner, and a rider ring and a sealing ring mounted on the piston intermediate the wiper rings and extending from the piston into contact with the cylinder liner, said wiper rings each comprising a solid lubricant compacted with a suitable binder therefor to enable the application of a film of solid lubricant on the surface of the cylinder liner upon reciprocation of the piston therewithin, and said cylinder liner comprising a surface coating of a material which cooperates with the film of solid lubricant applied by the wiper rings to bond the solid lubricant to the surface of the cylinder liner and maintain it thereon.

4. In a self-lubricating system as in claim 3 wherein, said solid lubricant is molybdenum disulphide, said material is molybdenum, and said rider and sealing rings are of non-metallic composition.

5. In a self-lubricating system for a reciprocating compressor which comprises a piston reciprocable within a cylinder liner, first and second spaced wiper rings carried by said piston and extending therefrom into contact with said cylinder liner, first and second, spaced rider rings carried by said piston between said wiper rings and extending from said piston into contact with said cylinder liner, and a plurality of spaced, sealing rings carried by said piston between said rider rings and extending from said piston into contact with said cylinder liner; said wiper rings comprising a solid lubricant compacted with a suitable binder therefor to enable the application of a film of solid lubricant to the surface of said cylinder liner upon reciprocation of said piston therewithin, said cylinder liner comprising a surface coating of a material which cooperates with the thusly applied film of solid lubricant to physically bond the latter to the said cylinder liner and maintain it thereon, and said rider and sealing rings being of non-metallic composition.

6. In a self-lubricating system as in claim 5 wherein, said solid lubricant is molybdenum disulphide, and said material is molybdenum.

7. In a self-lubricating system as in claim 6 wherein, said rider and sealing rings comprise compacted combinations of non-metals.

8. In a self-lubricating system as in claim 7 wherein, said rider and sealing rings comprise carbon-graphite compacts.

References Cited by the Examiner
UNITED STATES PATENTS

| 1,329,348 | 1/1920 | Copeland. | |
| 1,426,022 | 8/1922 | Thomson | 92—155 |
| 3,146,683 | 9/1964 | Hoffmann | 92—155 |

References Cited by the Applicant
UNITED STATES PATENTS

| 626,611 | 6/1899 | Hay. |
| 1,466,432 | 8/1923 | Gerleman. |
| 2,575,394 | 11/1951 | Rice. |
| 2,817,562 | 12/1957 | Fleming et al. |
| 3,125,004 | 3/1964 | White. |
| 3,133,477 | 5/1964 | Meijer. |

ROBERT M. WALKER, *Primary Examiner.*